(12) United States Patent
Zygmunt (10) Patent No.: US 8,131,714 B2
(45) Date of Patent: Mar. 6, 2012

(54) LINGUISTIC ASSISTANCE SYSTEMS AND METHODS

(75) Inventor: Jan Zygmunt, Longmont, CO (US)

(73) Assignee: Think Village-OIP, LLC, Niwot, CO (US)

( * ) Notice: Subject to any disclaimer, the term of this patent is extended or adjusted under 35 U.S.C. 154(b) by 372 days.

(21) Appl. No.: 12/347,240

(22) Filed: Dec. 31, 2008

(65) Prior Publication Data

US 2009/0171949 A1 Jul. 2, 2009

Related U.S. Application Data (60) Provisional application No. 61/018,604, filed on Jan. 2, 2008.

(51) Int. Cl.
*G06F 7/00* (2006.01)
*G06F 17/30* (2006.01)

(52) U.S. Cl. ........ 707/722; 707/723; 707/736; 707/748; 707/758; 704/1; 704/9

(58) Field of Classification Search .................. 707/705, 707/706, 713, 736, 999.1, 722, 723, 748, 707/758, 999.3; 704/1, 9
See application file for complete search history.

(56) References Cited

U.S. PATENT DOCUMENTS

| | | |
|---|---|---|
| 4,969,097 A | 11/1990 | Levin |
| 5,305,205 A | 4/1994 | Weber et al. |
| 5,390,279 A | 2/1995 | Strong |
| 5,621,641 A | 4/1997 | Freeman |
| 5,640,501 A | 6/1997 | Turpin |
| 5,664,896 A | 9/1997 | Blumberg |
| 5,715,469 A | 2/1998 | Arning |
| 5,734,749 A | 3/1998 | Yamada et al. |
| 5,835,087 A | 11/1998 | Herz et al. |
| 5,845,300 A | 12/1998 | Comer et al. |
| 5,896,321 A | 4/1999 | Miller et al. |
| 5,963,666 A | 10/1999 | Fujisaki et al. |
| 6,016,467 A | 1/2000 | Newsted et al. |
| 6,199,067 B1 | 3/2001 | Geller |
| 6,208,339 B1 | 3/2001 | Atlas et al. |
| 6,377,965 B1 | 4/2002 | Hachamovitch et al. |
| 6,539,421 B1 | 3/2003 | Appelman et al. |
| 6,618,697 B1 | 9/2003 | Kantrowitz et al. |
| 7,003,446 B2 | 2/2006 | Trower, II et al. |
| 7,171,353 B2 | 1/2007 | Trower, II et al. |
| 7,717,712 B2* | 5/2010 | Brun et al. ............ 434/156 |
| 7,912,847 B2* | 3/2011 | Lagad et al. .......... 707/758 |
| 2004/0162814 A1* | 8/2004 | Bergholz et al. ......... 707/3 |
| 2006/0271546 A1* | 11/2006 | Phung ................... 707/10 |
| 2007/0038615 A1* | 2/2007 | Vadon et al. ............ 707/4 |
| 2007/0179777 A1 | 8/2007 | Gupta et al. |
| 2007/0239729 A1* | 10/2007 | Giallanza ............... 707/10 |
| 2007/0282811 A1* | 12/2007 | Musgrove ............... 707/3 |
| 2008/0077859 A1* | 3/2008 | Schabes et al. .......... 715/257 |
| 2009/0067756 A1* | 3/2009 | Meyer et al. ............ 382/310 |

* cited by examiner

*Primary Examiner* — Hares Jami
(74) *Attorney, Agent, or Firm* — Lathrop & Gage LLP (57) ABSTRACT

System and Methods determine a linguistic preference between two or more phrases. Each of the phrases is submitted to at least one search engine as a search string. Search results are retrieved from each of the at least one search engine for each submitted search string and total hit values of each search result are compared. One of the two or more phrases associated with the greatest total hit value are displayed to a user as the preferred phrase.

8 Claims, 9 Drawing Sheets

PROBLEM SET 301

PHRASE 302(1)
"in the beginning of this letter"

PHRASE 302(2)
"at the beginning of this letter"

TYPE 303
COMPARISON

308(1)

SEARCH RESULTS 306(1)

Web Personalized Results 1 - 10 of about 641 for "in the beginning of this letter". (0.18 seconds)

correspond to the values outlined in the beginning of this letter, i.e. the teachings of and I want you all, as I have stated in the beginning of this letter, to have heard the truth the war (as outlined in the beginning of this letter) and the necessity of the As I said in the beginning of 'this Letter, I hold no brief as noted in the beginning of this letter, we remain committed

308(2)

SEARCH RESULTS 306(2)

Web Personalized Results 1 - 10 of about 58,300 for "at the beginning of this letter". (0.34 seconds)

reconciled with the values outlined at the beginning of this letter and duty to the tradition and reference the Department of Justice complaint number cited at the beginning of this letter.

But I referred you, at the beginning of this letter, to Dr.

Simply put your cursor at the beginning of this letter and drag your cursor to to break the promise I gave at the beginning of this letter, and am, with cordial greetings to you

PROBLEM SET 401

PHRASE 402
"he is intelligent, but"

TYPE 403
COMPLETE

SEARCH RESULTS 406

So far as she is concerned, he is intelligent but not intellectual. She contradicts the OED; but this is a prevalent perception among those who consider ... — 408(1)

His self-deception might be not that he is intelligent but that he cares about being intelligent. Some of Hellman's examples that are supposed to make ... — 408(2)

He is intelligent, but makes decisions by following the opinions of others, rather than his own mind. He will face misfortune because of the treachery of ... — 408(3)

"You told me that he is intelligent but he cannot even solve simple arithmetic problems!" is a possible and apparently legitimate reaction from the listener ... — 408(4)

He is intelligent, but will not enter into any profound discussion of law, metaphysics, poetry, art, or any of the finer topics of conversation. ... — 408(5)

He is intelligent but can be easily persuaded. He will have high rank and many people to serve him. If he is a farmer he will have beautiful crops, ... — 408(6)

That conviction makes it easier for him to understand his own life (he is intelligent, but for some reason lives in a cave and is driven by a need to hunt) ... — 408(7)

He is intelligent but has to rely on me to tell him when he is being tactless, annoying or upsetting people. He can fix anything, he says he can literally ... — 408(8)

He is intelligent, but unable to express himself, and his inability to win his battles frustrates him. Contrariwise, he could also be a braggart - a ... — 408(9)

i) Denial of quality: "He is intelligent, but not too much so, since he works in a factory". ii) Modification of the quality — 408(10)

*FIG. 9*

LINGUISTIC ASSISTANCE SYSTEMS AND METHODS

RELATED APPLICATIONS

This application claims priority to U.S. Provisional Application Ser. No. 61/018,604, filed Jan. 2, 2008, and is incorporated herein by reference.

BACKGROUND

Search engines are typically used to find articles and information on the World Wide Web (www) given a keyword, short phrase or other relevant input, hereinafter 'search string'. A search engine typically returns a prioritized list of search results containing one or more hyperlinks. The user may then select (i.e., click on using a mouse or other input device) one of these hyperlinks to 'jump' to the associated web page that contains the search string. The search engine typically provides exemplary text, containing the search string, from each search result to thereby provide a context for the result to enable the user to identify the more appropriate search results without having to select each hyperlink in turn.

SUMMARY OF THE INVENTION

A user may use search results from a search engine on the World Wide Web (www) to assist when formulating sentences or text in a certain language, particularly where that language is not native to the user.

In one embodiment, the user enters a first search string containing the first option for a sought sentence or phrase. The search engine returns search results with context for each use of the first search string found in text posted to the www and a first total number of matches found. The first total number of matches found is noted. The user then enters a second search string containing a second option for the sought sentence or phrase. The search engine returns search results with context for each use of the second search string found in text posted to the www and a second total number of matches found. The first total number of matches found is compared to the second total number of matches found; the search string with the greater number of matches, the more probable that the search string is correct. For example, the sentence or phrase within the second search string is selected for use if the second total number of matches is greater than the first total number of matches.

In another embodiment, a user is attempting to form a phrase within a sentence but cannot think of the most appropriate wording. The user enters a search string containing the known words of the phrase. The search engine then returns search results with context for each use of the search string found in text posted to the www. The context may provide phrases using the given words thereby providing options for completing the sentence.

In another embodiment, a method determines a linguistic preference between two or more phrases. Each of the phrases is submitted to at least one search engine as a search string. Search results are retrieved from each of the at least one search engine for each submitted search string and total hit values of each search result are compared. One of the two or more phrases associated with the greatest total hit value are displayed to a user as the preferred phrase.

In another embodiment, a software product has instructions, stored on non-transitory computer-readable media, wherein the instructions, when executed by a computer, perform steps for utilizing a search engine to determining a linguistic preference between two or more phrases, including: instructions for submitting each of the phrases to the search engine as a search string; instructions for receiving search results from the search engine for each search string; instructions for comparing the total number of hits for each search string; and instructions for selecting the phrase with the largest number of associated hits as the preferred phrase.

In another embodiment, a method provides linguistic assistance to complete a phrase. A phrase is submitted as a search string to at least one search engine. A search result containing a plurality of context strings that match the search string is received from each of the at least one search engines. The context strings of each search result are analyzed to identify one or more phrases to complete the partial phrase.

In another embodiment, a system compares two or more phrases to determine a preferred one of the phrases. A linguistic analysis tool retrieves search results from at least one search engine for each of the two or more phrases, and the linguistic analysis tool evaluates the search results to determine the preferred one of the phrases. A linguistic interface identifies the two or more phrases, communicates with the linguistic analysis tool and identifies the preferred one of the phrases to a user.

In another embodiment, a system provides linguistic assistance in completing a phrase. A linguistic analysis tool retrieves search results from at least one search engine for the phrase, and processes the search results to determine the one or more follow-on phrases. A linguistic interface identifies the phrase, communicates with the linguistic analysis tool and displays one or more follow-on phrases for the phrase.

BRIEF DESCRIPTION OF THE FIGURES

FIG. 9 shows exemplary data for completing a phrase using the linguistic assistance system of FIG. 1.

DETAILED DESCRIPTION OF THE FIGURES

Figure 1:
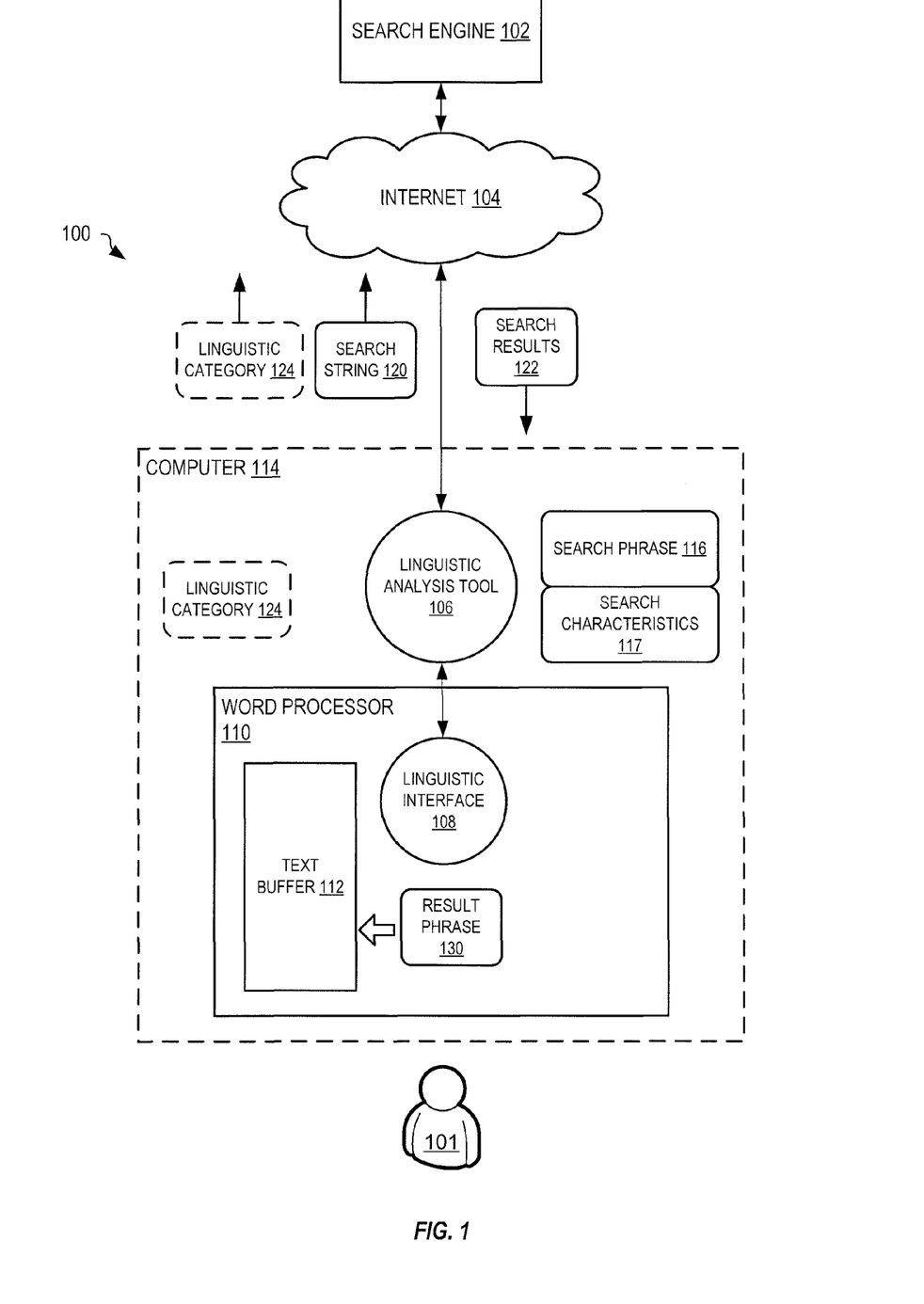
FIG. 1 shows one exemplary linguistic assistance system, of an embodiment.

FIG. 1 shows one exemplary linguistic assistance system 100 for assisting a user 101 with selection of appropriate linguistic phrases. System 100 is shown with a linguistic interface 108 for interacting with user 101 and a linguistic analysis tool 106 for interacting with one or more search engines and analyzing returned search results. Linguistic analysis tool 106 and linguistic interface 108 may operate on a computer 114 used by user 101. Linguistic interface 108 is shown within a word processor 110, and may operate within other linguistic based software applications, such as a spreadsheet or database application, without departing from the scope hereof.

Word processor 110 is shown with a text buffer 112 that represents storage of text being processed. In one embodiment, linguistic interface 108 may be implemented as an add-in tool for word processor 110. In an alternate embodiment, linguistic interface 108 may operate independently of word processor 110. In another embodiment, linguistic analysis tool 106 and linguistic interface 108 are combined.

Linguistic interface 108 interacts with user 101 to prepare one or more search phrases 116 that are submitted to linguistic analysis tool 106. For example, user 101 may wish to determine which of two phrases is more common, and therefore more correct. Linguistic interface 108 may interact with user 101 to determine other desired characteristics of search phrase 116, such as a linguistic category 124 which may be selected from the group including literary works, technical works, news articles, and general. In one example, if linguistic category 124 is technical works, search engine 102 is restricted to searching technical databases, such as patent databases, thereby restricting search results to those found within published patent information. Linguistic interface 108 may also define other search characteristics (shown as search characteristics 117) to specify the type of linguistic analysis (e.g., phrase comparison, phrase completion, etc.) to be performed by linguistic analysis tool 106. Linguistic interface 108 sends the search phrase, linguistic category 124 and other search characteristics 117 to linguistic analysis tool 106, which prepares one or more search string 120 and submits them to a search engine 102 via Internet 104 or other network connectivity. Search engine 102 may represent one or more of Google™, Yahoo!™, Ask™, etc. Search engine 102 returns search results 122 to linguistic analysis tool 106, via Internet 104, and linguistic analysis tool 106 analyzes search results 122 to determine at least one result phrase 130. In one embodiment, linguistic analysis tool 106 presents user 101 a choice based upon search results 122 via linguistic interface 108, such that user 101 may make an informed selection.

In one embodiment, linguistic interface 108 automatically inserts result phrase 130 into text buffer 112 of word processor 110 based upon user preferences. Further, linguistic interface 108 may monitor text buffer 112 interaction by user 101 to automatically determine when linguistic assistance would be of benefit. For example, by monitoring indecision and hesitation of input to text buffer 112 by user 101, linguistic interface 108 may automatically identify one or more phrases from text buffer 112, send these phrases to linguistic analysis tool 106 as search phrases 116 and receive one or more result phrases 130 from linguistic analysis tool 106 based upon search results 122. Linguistic interface 108 may then present one or more preferred phrases, based upon input to text buffer 112 by user 101 and without specific instruction from user 101 for such assistance. Thus, linguistic assistance system 100 may operate autonomously in a manner similar to spelling and grammar checkers (not shown) of word processor 110.

Figure 2:
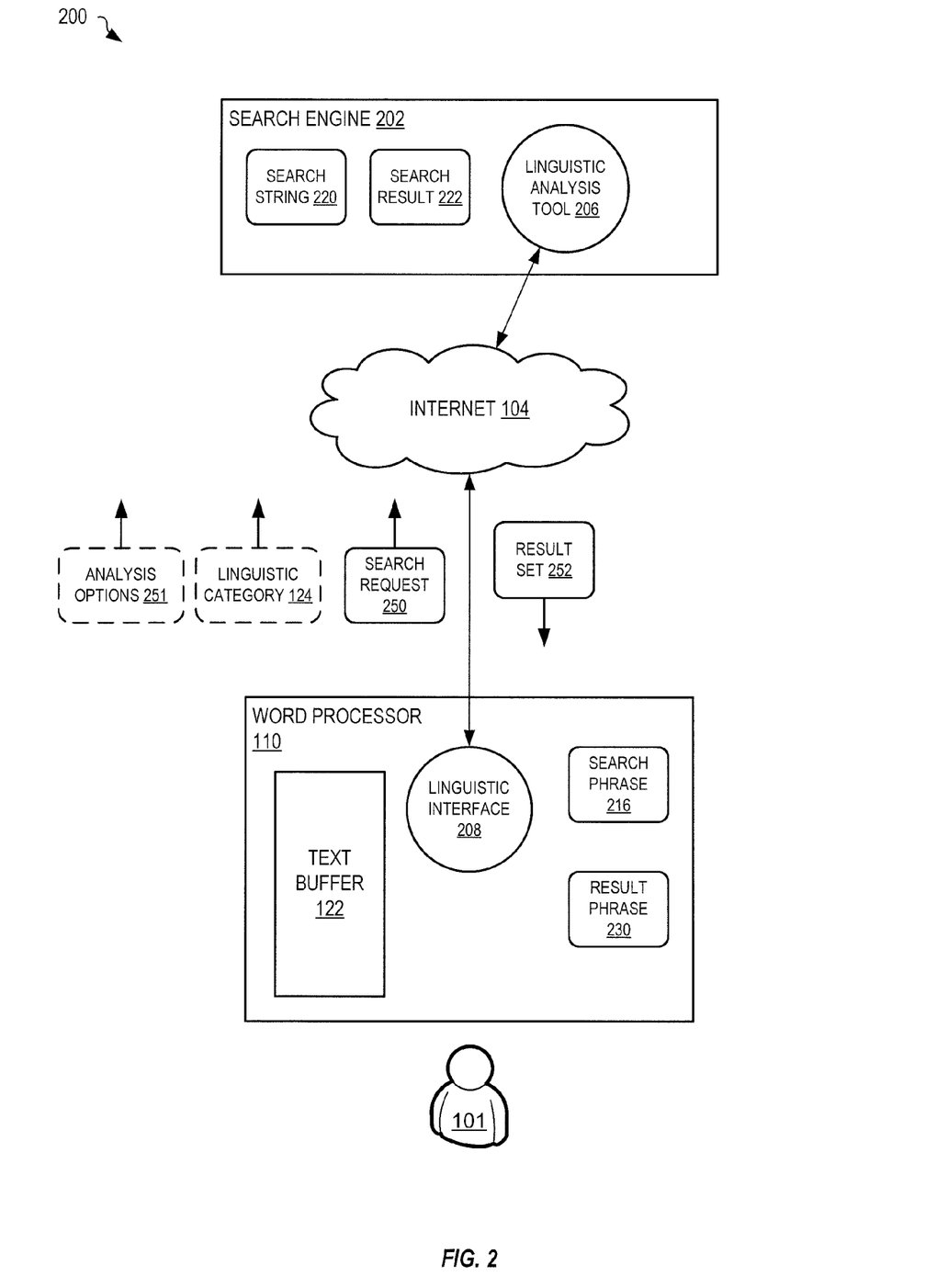
FIG. 2 shows one exemplary linguistic assistance system having a remotely located linguistic analysis tool, of an embodiment.

In an alternate embodiment, FIG. 2 shows one exemplary linguistic assistance system 200 similar to system 100, FIG. 1, where a linguistic analysis tool 206 is located within a search engine 202. A linguistic interface 208 within word processor 110 operates similarly to linguistic interface 108 but communicates with linguistic analysis tool 206 via internet 104. Linguistic interface 208 sends a search request 250 to linguistic analysis tool 206 via Internet 104. Search request 250 may include, or be accompanied by, a linguistic category 124 to instruct linguistic analysis tool 206 to restrict the search by search engine 202. Search request 250 may include one or more search phrases 216 determined by linguistic interface 208. Linguistic interface 208 determines search phrases 216, for example by analyzing its interaction with user 101 and/or by monitoring of text buffer 112. Linguistic analysis tool 206 then submits one or more search strings 220 to search engine 202 and receives search result 222 in return. Linguistic analysis tool 206 may then analyze search result 222 to determine one or more result phrases 230 that are returned to linguistic interface 208 as result set 252. Linguistic interface 208 may include analysis options 251 with search request 250 to specify one or more analysis preferences for linguistic analysis tool 206. In one example, analysis options 251 specify a type of search to be performed by search engine 202 and options for processing search results 222.

Upon receiving result set 252, linguistic interface 208 may interact with user 101 to allow selection of one or more result phrases 230 from result set 252. Alternatively, linguistic interface 208 may automatically insert result phrase 230 into text buffer 112.

Figure 3:
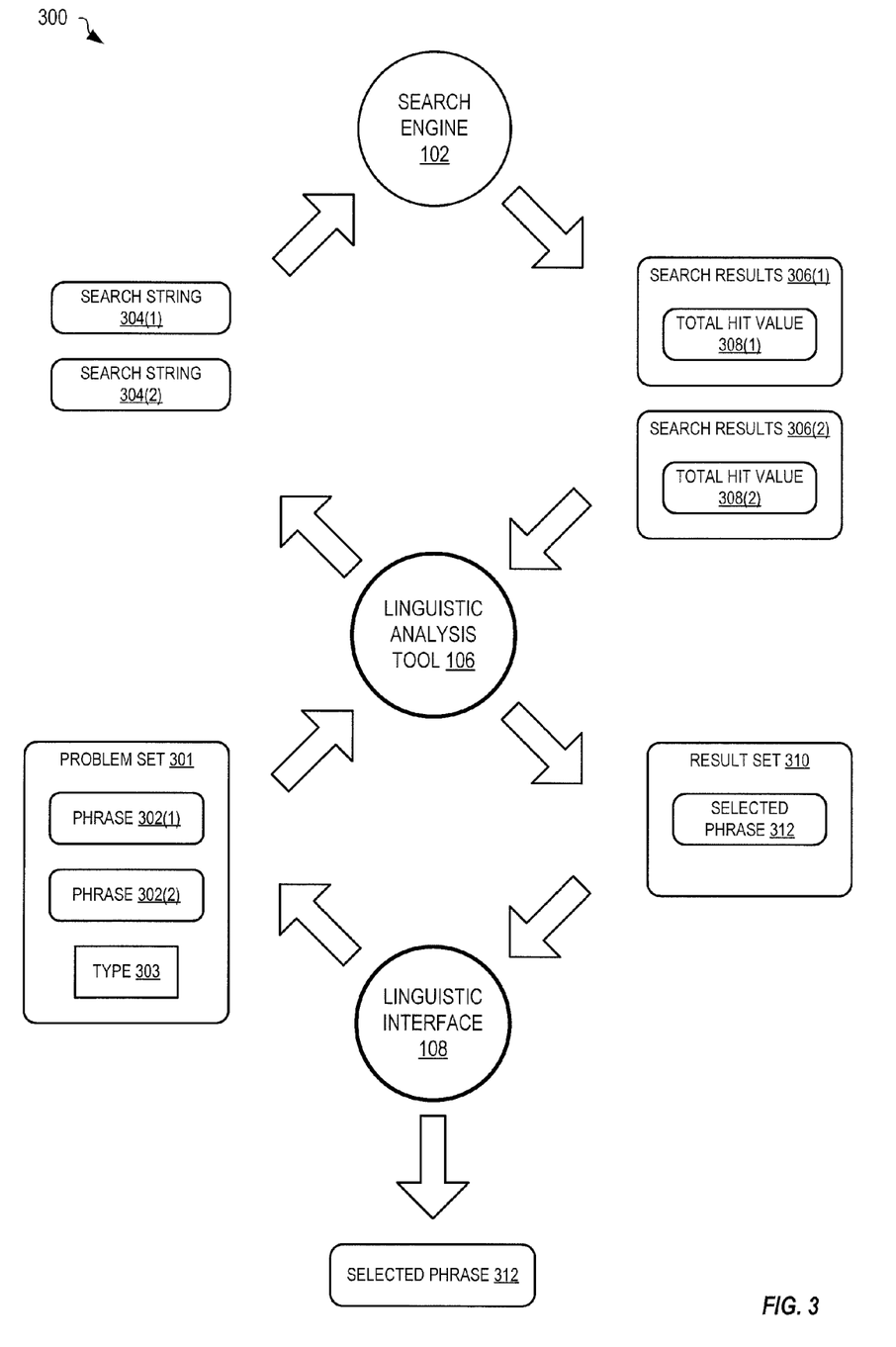
FIG. 3 is a data flow diagram illustrating exemplary operation of the linguistic assistance system of FIG. 1 to use a search engine to determine a more correct phrase from a plurality of phrases.

FIG. 3 is a data flow diagram 300 illustrating exemplary operation of linguistic assistance system 100, FIG. 1 to use search engine 102 to determine a more correct phrase from a plurality of phrases 302. That is, linguistic assistance system 100 compares two phrases using search engine 102. Linguistic interface 108 is used to specify two phrases 302(1) and 302(2), each containing a phrase for evaluation against each other by linguistic assistance system 100. Phrases 302 are sent to linguistic analysis tool 106 where they are formed into search strings 304. In particular, linguistic analysis tool 106 creates search string 304(1) from phrase 302(1) and creates search string 304(2) from phrase 302(2). For example, linguistic analysis tool 106 includes phrase 302(1) within double quotes to form search string 304(1), and linguistic analysis tool 106 includes phrase 302(2) within double quotes to form search string 304(2).

Linguistic analysis tool 106 first submits search string 304(1) to search engine 102; search engine 102 sends search results 306(1) to linguistic analysis tool 106 in return. Then, linguistic analysis tool 106 submits search string 304(2) to search engine 102; search engine 102 sends search results 306(2) to linguistic analysis tool 106 in return. Search results 306(1) include a total hit value 308(1) that specifies the total number of hits found by search engine 102 for search string 304(1). Search results 306(2) include a total hit value 308(2) that specifies the total number of hits found by search engine 102 for search string 304(2). Where search engine 102 does not provide a hit count, linguistic analysis tool 106 may further interrogate search engine 102 to determine total hit values. Linguistic analysis tool 106 may then determine a result set 310 based upon submitted problem set 301, for return to linguistic interface 108. In one example, linguistic analysis tool 106 returns result set 310 containing one of phrases 302 as a selected phrase 312 based upon the greater of the determined total hit values 308. Linguistic interface 108 may then return selected phrase 312 to a user and/or automatically insert selected phrase 312 into the user's text.

In one embodiment, search engine 102 provides an interface to linguistic analysis tool 106 to facilitate searching and result retrieval. This interface may provide linguistic analysis tool 106 with other statistics of performed searches and results.

Although only two phrases are compared in the example of FIG. 3, more than two phrases may be compared by linguistic assistance system 100 without departing from the scope hereof.

Figure 8:
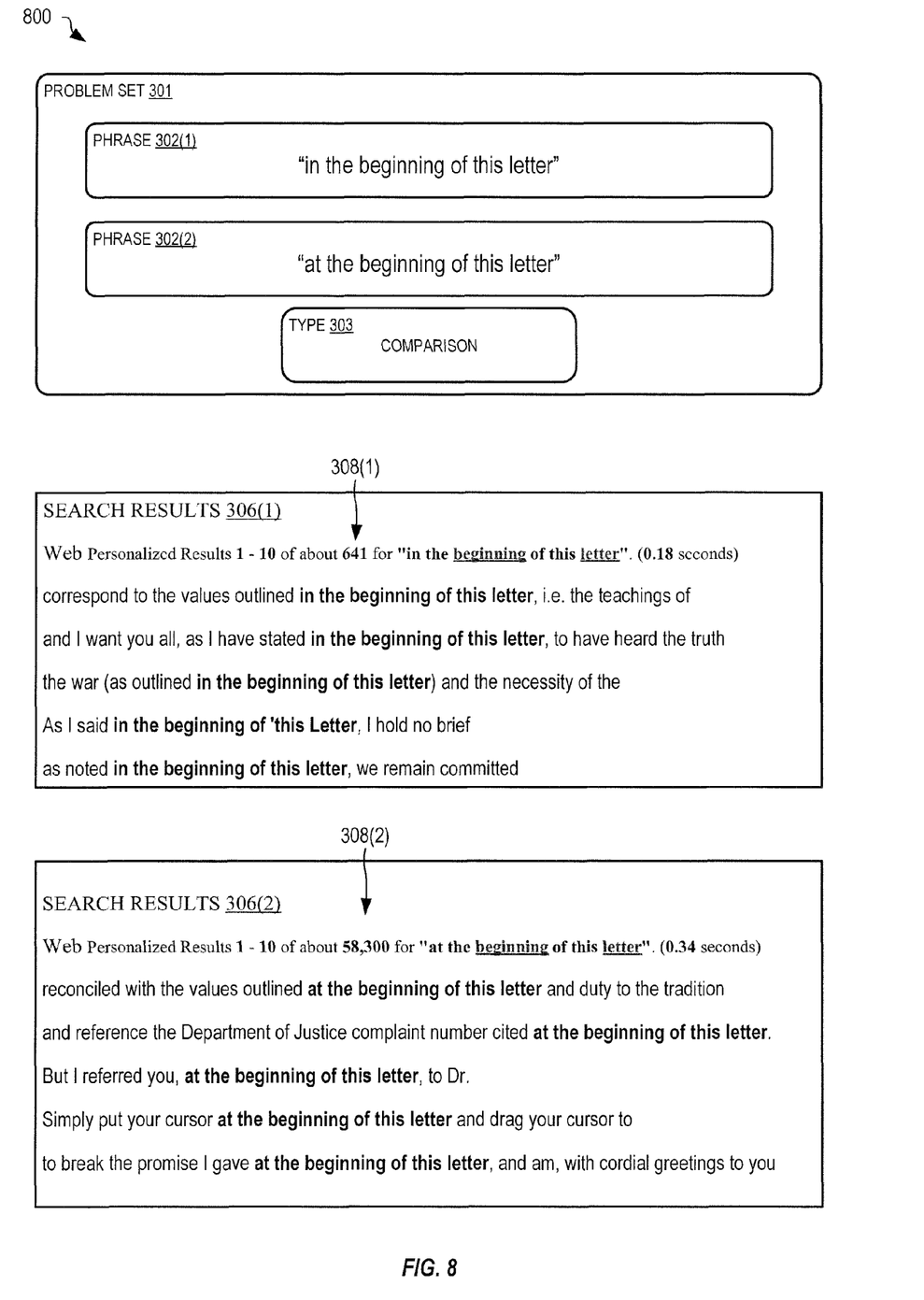
FIG. 8 shows exemplary data for comparing two phrases using the linguistic assistance system of FIG. 1.

FIG. 8 shows exemplary data 800 for comparing two phrases. Problem set 301 is shown with phrases 302(1), 302(2) of "in the beginning of this letter" and "at the beginning of this letter", respectively, and type 303 is set to 'compare'. Linguistic analysis tool 106 submits each phrase 302(1) and 302(2) to search engine 102 as search strings 304(1) and 304(2) and receives search results 306(1), 306(2) in return. Search results 306(1) show exemplary data returned by search engine 102 for phrase 302(1); search results 306(2) show exemplary data returned by search engine 102 for phrase 302(2). Search results 306(1) contain total hit value 308(1) with a value of 641 and search results 306(2) contain total hit value 308(2) with a value of 58,300. Thus, in this example, phrase 302(2) is used more often within the searched database than phrase 302(1) and linguistic analysis tool 106 therefore selects phrase 302(2) as being more correct.

Where the total hit values 308 are relatively close to one another, automatic selection of a preferred phrase may not occur. For example, where a first total hit value is 1008 and a second total hit value is 927, the second total hit value is 8% less that the first total hit value. Linguistic assistance system 100 may include a 'minimum difference value' (e.g., 20%) such that where compared total hit values are within this 'minimum difference value' of one another, each search result is displayed to the user and the user is allowed to select the preferred phrase based upon context. Alternatively, the user may modify one or more of the comparison phrases and perform another comparison.

Figure 4:
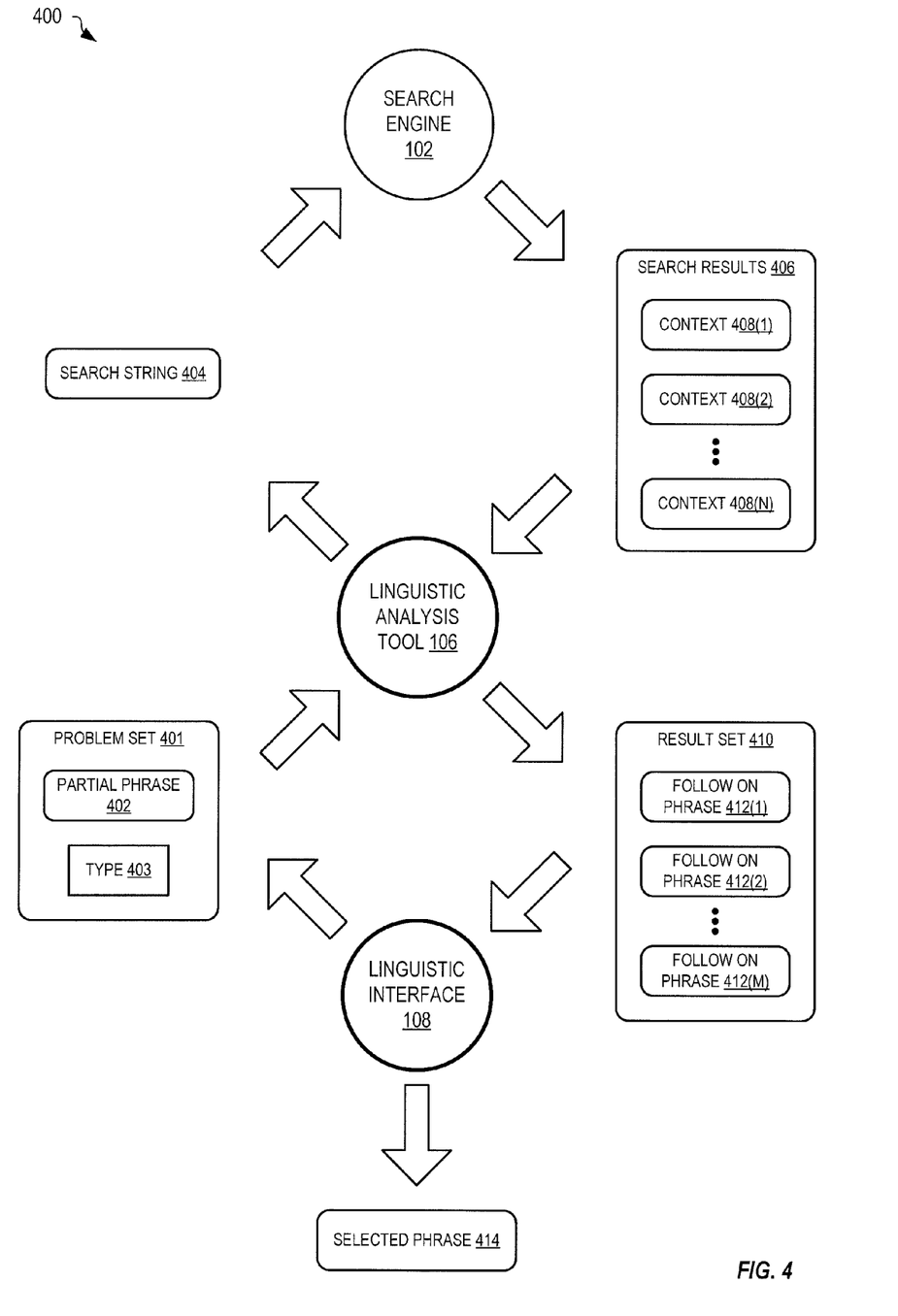
FIG. 4 is a data flow diagram illustrating exemplary operation of the linguistic assistance system of FIG. 1 to use a search engine to complete a partial phrase.

FIG. 4 is a data flow diagram 400 illustrating exemplary operation of linguistic assistance system 100, FIG. 1, to use search engine 102 to complete a partial phrase. Linguistic interface 108 is used to specify a partial phrase 402 that contains words that form an incomplete phrase sought by the user. Partial phrase 402 is sent to linguistic analysis tool 106 where it is formed into search string 404.

Linguistic analysis tool 106 submits search string 404 to search engine 102; search engine 102 sends search results 406 to linguistic analysis tool 106 in return. Search results 406 include one or more context strings 408 (shown as N context strings) that each provide a found string in the context of search string 404. Linguistic analysis tool 106 then determines a result set 410 based upon submitted problem set 401, for return to linguistic interface 108. In one example, linguistic analysis tool 106 returns result set 410 containing a plurality of follow-on phrases 412 (shown as M phrases) for display to the user by linguistic interface 108. Based upon input to linguistic interface 108, one follow-on phrase 412 may be selected as selected phrase 414 and inserted into the user's text.

In one embodiment, as user 101 types text into text buffer 112 of word processor 110, linguistic assistance system 100 monitors the entered text and interaction by user 101 to automatically provide one or more phrases to complete a partial sentence entered by user 101. For example, when user 101 stops typing part way through a sentence, linguistic analysis tool 106 utilizes at least part of the partially entered sentence as partial phrase 402 and uses search engine 102 to retrieve follow-on phrases 412 that may be presented to user 101. That is, linguistic interface 108 and linguistic analysis tool 106 operates 'behind the scenes' of word processor 110 (e.g., similar to spelling and grammar checkers) to provide additional linguistic assistance to user 101.

FIG. 9 shows exemplary data 900 for completing the phrase "he is intelligent, but" using linguistic assistance system 100, FIG. 1 and search engine 102. Partial phrase 402 of problem set 401, FIG. 4, has a value of "he is intelligent, but" and type 403 is set to 'complete'. Linguistic analysis tool 106 submits partial phrase 402 to search engine 102 and receives search results 406 in return. In the example of FIG. 9, search results 406 contain ten context strings 408(1)-408(10), each of which includes the phrase defined by phrase 402 and is shown within the context of the matched results. Thus, linguistic analysis tool 106 may display one or more of context strings 408 to the user (e.g., using linguistic interface 108) thereby allowing the user to select an appropriate way to continue their phrase.

Figure 5:
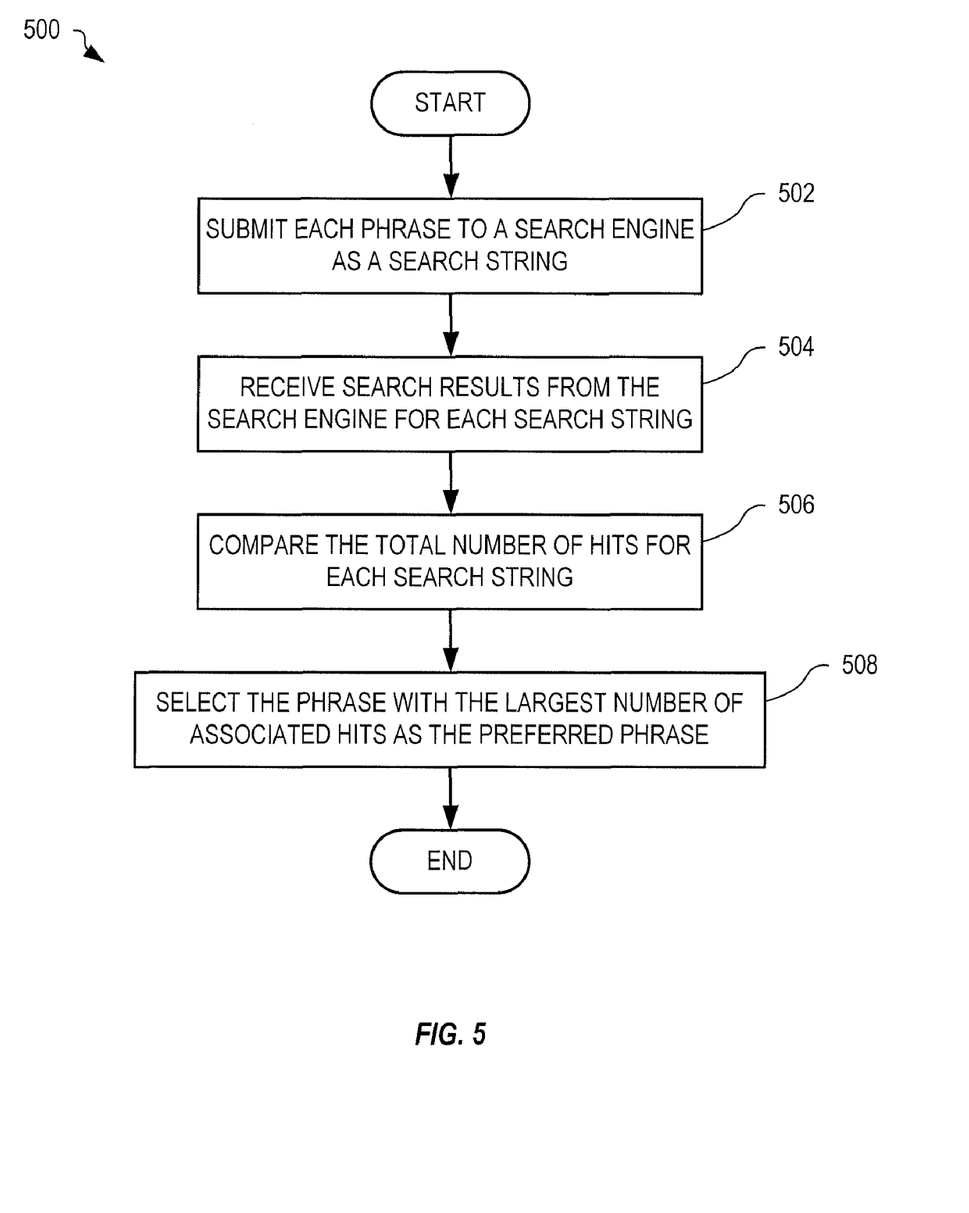
FIG. 5 is a flowchart illustrating one exemplary method for selecting a most correct phrase using a search engine, in an embodiment.

FIG. 5 is a flowchart illustrating one method 500 for selecting a most correct phrase using a search engine. Method 500 may operate within one or both of linguistic interface 108 and linguistic analysis tool 106. In step 502, method 500 submits each phrase to a search engine. In one example of step 502, linguistic analysis tool 106 submits search string 304 containing phrase 302 to search engine 102. In step 504, method 500 receives search results from the search engine for each search string. In one example of step 504, linguistic analysis tool 106 receives search results 306 for each submitted search string 304. In step 506, the total numbers of hits for each search string are compared, and the phrase with the largest number of hits is selected as the preferred phrase in step 508. In one example of steps 506 and 508, linguistic analysis tool 106 compares total hit values 308 for each search string 304 and selects one of phrases 302 with the largest number of hits as selected phrase 312.

Figure 6:
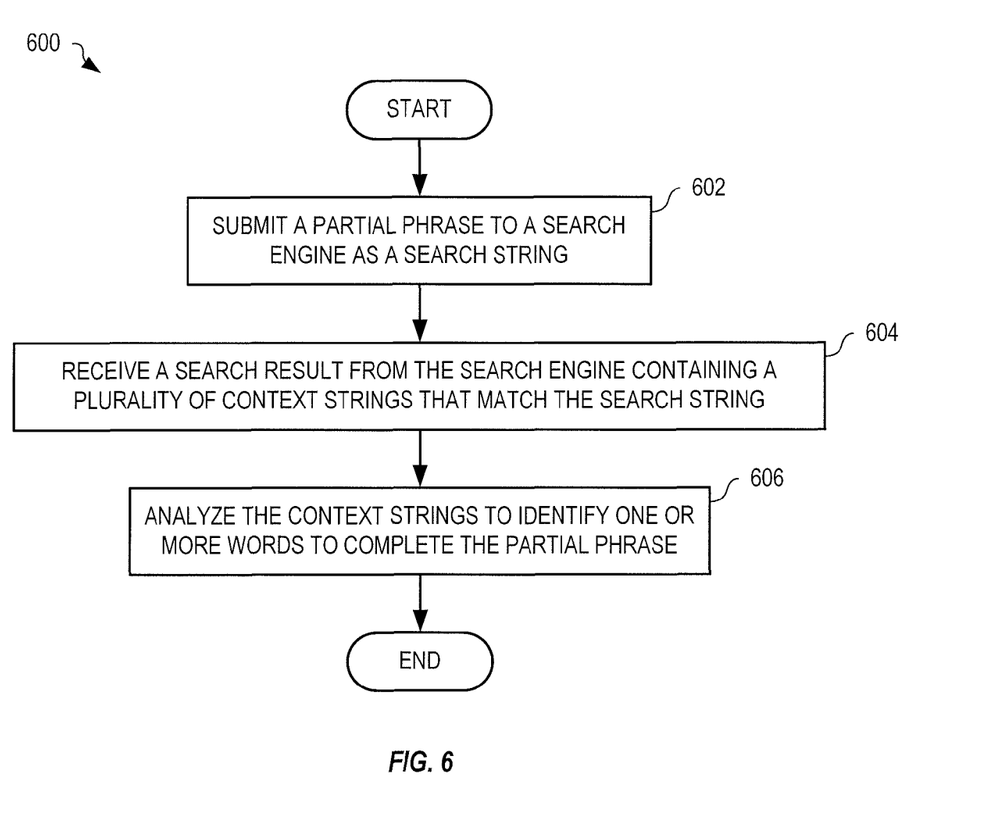
FIG. 6 is a flowchart illustrating one exemplary method for completing a phrase, given a partial phrase, using a search engine, in an embodiment.

FIG. 6 is a flowchart illustrating one method 600 for completing a phrase, given a partial phrase, using a search engine. Method 600 may operate within one or both of linguistic interface 108 and linguistic analysis tool 106. In step 602, method 600 submits a partial phrase to a search engine as a search string. In one example of step 602, linguistic interface 108 submits a partial phrase to linguistic analysis tool 106, which in turn submits the partial phrase as search string 120 to search engine 102 via internet 104. In step 604, method 600 receives a search result from the search engine containing a plurality of context strings that match the search string. In one example of step 604, linguistic analysis tool 106 receives, from search engine 102, search results 406 containing N context strings 408 that were found by search engine 102 based upon search string 404. In step 606, method 600 analyzes the context strings to identify one or more words to complete the partial phrase. In one example of step 606, linguistic analysis tool 106 analyzes context strings 408 to determine one or more follow-on phrases 412 that complete partial phrase 402 and returns these follow-on phrases 412 to linguistic interface 108 as result set 410.

Figure 7:
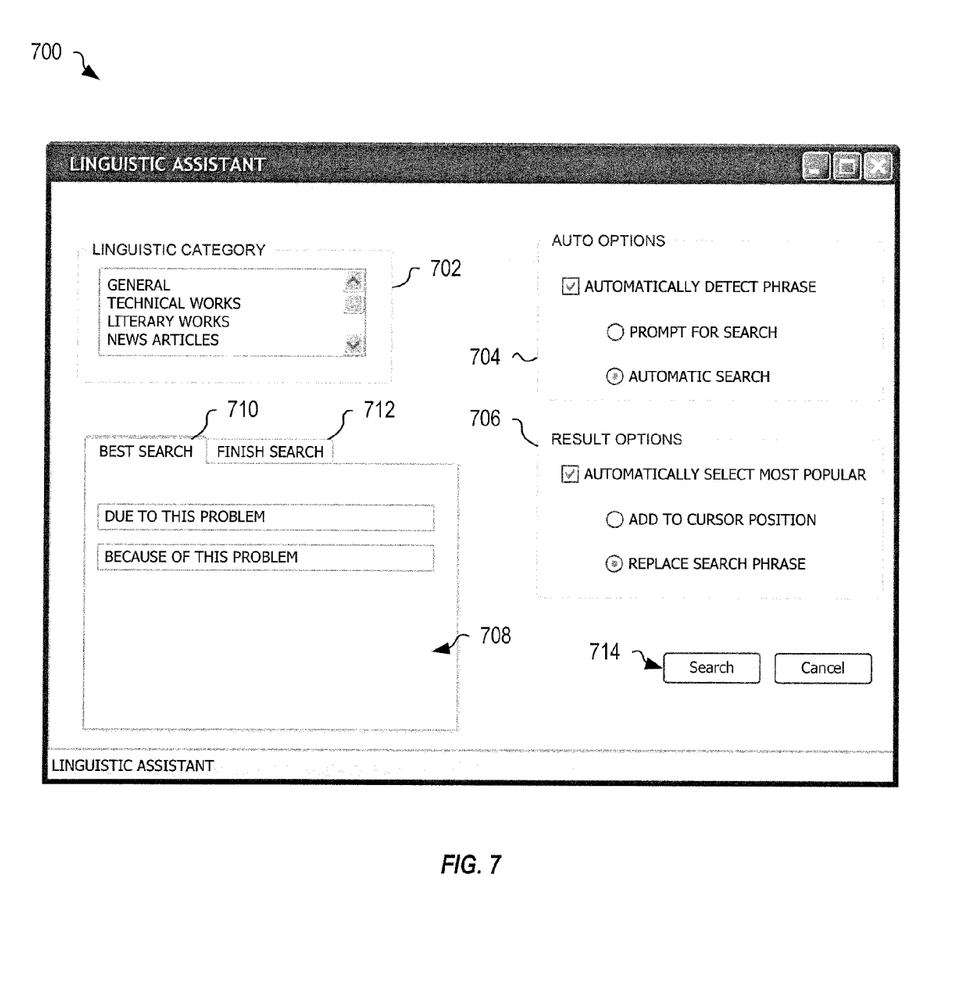
FIG. 7 shows one exemplary interface window that is presented by the linguistic interface of FIG. 1 to interact with a user.

FIG. 7 shows one exemplary interface window 700 that is presented by linguistic interface 108 to interact with a user. Interface window 700 has a linguistic category selection list 702 that allows the user to select one or more of a general category (e.g., all categories), technical works category, literary works category and news articles category. Other categories may be included within linguistic category selection list 702 without departing from the scope hereof.

An auto options group 704 allows the user to select desired actions upon determining results by system 100. A results options group 706 allows the user to specify whether results should be selected automatically by system 100 (the alternative being that result options are displayed for the user to select from), and if they are automatically selected, where they are inserted into the user's text—at the cursor position, or to replace the search phrase selected from the user's text.

A tabbed area 708, selectable through tabs 710 and 712, allows entry of phrases, or partial phrases, for the search. Where automatic detection of phrases is selected within auto options group 704, one or more phrases and/or partial phrases may be selected from the user's text and inserted within tabbed area 708.

Upon selection of search button 714, information of interface window 700 may be packed to form a problem set 301, 401, and sent to linguistic analysis tool 106.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A method for determining a linguistic preference between two or more phrases each of the two or more phrases including a plurality of words, comprising:
   submitting each of the two or more phrases simultaneously, and one or more linguistic categories, as a search string to at least one search engine, wherein a search performed by the at least one search engine is restricted to the one or more linguistic categories;
   receiving search results from each instance of the at least one search engine for each submitted search string;
   comparing total hit values of each search result with each other; and
   displaying, to a user, one of the phrases associated with a greatest total hit value as a preferred phrase,
   wherein the step of displaying comprises displaying, to the user, two or more of display phrases where a difference between the total hit values of the two or more phrases is less than a predefined percentage.

2. The method of claim 1, the one or more linguistic categories comprising at least two distinct linguistic categories.

3. The method of claim 2, wherein the at least two distinct linguistic categories are selected from the group including literary works, technical works, news articles, and general.

4. The method of claim 1, the steps of submitting and receiving comprising communicating with the at least one search engine via the Internet.

5. The method of claim 1, the steps of submitting and receiving comprising communicating with the at least one search engine via an Intranet.

6. The method of claim 1, the steps of submitting and receiving comprising communicating with the at least one search engine via a local area network.

7. The method of claim 1, the step of comparing being performed by the at least one search engine.

8. A software product comprising instructions, stored on non-transitory computer-readable media, wherein the instructions, when executed by a computer, perform steps for utilizing a search engine to determining a linguistic preference between two or more linguistically distinct phrases, comprising:
   instructions for simultaneously submitting each of the two or more linguistically distinct phrases as a search string to the search engine, each of the two or more linguistically distinct phrases comprising two or more linguistic words;
   instructions for receiving search results from the search engine for each search string;
   instructions for comparing a total number of hits for each search string with each other;
   instructions for selecting one of the phrases having a largest number of associated hits as a preferred phrase;
   instructions for presenting the preferred phrase to a user; and
   instructions for presenting both the preferred phrase and another of the two or more phrases to the user when a difference between the total number of associated hits of the preferred phrase and the another of the two or more phrases is less than a predefined number,
   wherein the instructions form part of a word processor.

* * * * *